United States Patent

[11] 3,607,657

[72] Inventors Hamao Umezawa
23, 4 chome, Toyotama kita, Nerima-ku;
Yoshiro Okami, 18-3, 6 chome,
Denenchofu, Ohta-ku; Tomio Takeuchi,
273, Imaizumi-cho, Ohta-ku; Masa Hamada, 3-4, 7 banchi, 1 chome, Fujimachi, Hoya, all of Tokyo, Japan
[21] Appl. No. 714,432
[22] Filed Mar. 20, 1968
[45] Patented Sept. 21, 1971
[32] Priority Apr. 7, 1967
[33] Japan
[31] 42/21865

[54] PROCESS FOR THE PRODUCTION OF KASUGAMYCIN
2 Claims, No Drawings

[52] U.S. Cl. ........................................................... 195/80
[51] Int. Cl. ........................................................... C12d 9/00
[50] Field of Search............................................ 195/80

[56] References Cited
OTHER REFERENCES
Chemical Abstracts, Vol. 64, 1966, p. 11824f.

*Primary Examiner*—Joseph M. Golian
*Attorneys*—Herbert W. Taylor, Jr. and Richard H. Brink ABSTRACT: Kasugamycin is produced by fermentation of a new species of streptomyces which has been named Streptomyces kasugaspinus.

PROCESS FOR THE PRODUCTION OF KASUGAMYCIN

BACKGROUND OF THE INVENTION

1. Field of the Invention

Improved and alternate methods were desired for the production of kasugamycin which is an antibiotic of particular value in the prevention and treatment of rice blast disease, e.g., as caused by *Piricularia oryzae*.

2. Description of the Prior Art

The antibiotic kasugamycin and its production by fermentation of *Streptomyces kasugaensis* have been described by Hamao Umezawa et al., as in J. of Antibiotics, 18, 101–103 (1965) and U.S. Pat. No. 3,358,001.

SUMMARY OF THE INVENTION

There is provided by the present invention the process of the production of kasugamycin which comprises cultivating a strain of *Streptomyces kasugaspinus* in an aqueous carbohydrate solution containing at least one nitrogenous nutrient under submerged aerobic conditions until a substantial and preferably a commercially useful quantity of kasugamycin is formed in said solution. In a preferred embodiment the strain is NIHJ MC–2–42 or a mutant thereof or a naturally occurring isolate thereof.

DESCRIPTION OF THE PREFERRED EMBODIMENTS

The publication and U.S. patent named above described the characteristics of *S. kasugaensis* M338–M1 and related mutants producing kasugamycin. This invention relates to a new micro-organism which is clearly differentiated from *S. kasugaensis* M338–M1 and its mutants by the structure of its spore surface.

The new micro-organism described below is classified as an actinomycete of the *Streptomyces* genus. In actinomycetes, it has been well known that they can be mutated easily either artificially or spontaneously but the special structure of the spore surface such as spiny or hairy structure cannot be changed very often. Therefore, the structure on the spore surface is used as a stable criterion for differentiating species of genus *Streptomyces*. Thus, a micro-organism which we found to produce kasugamycin and to have a spiny structure on the spore surface is differentiated from *S. kasugaensis* which has a smooth spore surface and the micro-organism is also differentiated from other species of streptomyces. We have named this micro-organism to be a new species, *Streptomyces kasugaspinus*, and describe below the process for preparation of kasugamycin by cultivation of this new micro-organism and purification from the fermented beer.

The new micro-organism was isolated from a soil sample collected at Maruyama, Usuda cho in Nagano prefecture in June, 1965, by using glycerol-casein agar medium. The organism was designated in our laboratory as MA350–C3. A culture of MA350–C3 was deposited in the culture collection of the National Institute of Health, Tokyo, Japan and is available therefrom under accession number NIHJ MC–2–42.

The organism showed the following characteristics:

MA350–C3 branched very well in substrate medium and developed aerial mycelium without whorl formation but having numerous spirals of various types including open, primitive or closed type. Under electronmicroscope, spiny structure was observed on the spore surface. The characteristic properties on various media were as follows:

1. On glycerol-Czapek's agar, incubated at 27° C.: Colorless to slightly yellowish growth. Abundant aerial mycelium is white to light brownish gray (silver gray 3 fe, determined by Color Harmony Manual (abbreviated to CHM hereafter). Soluble pigment is none or slightly yellowish.
2. On Krainsky's glucose asparagine agar incubated at 27° C.: Colorless growth. Abundant white to light gray aerial mycelium changed to light brownish gray (shadow gray 5 ih, determined by CHM). No soluble pigment.
3. On calcium malate agar incubated at 27° C.: Colorless to pale yellowish or pale orange-colored growth. White aerial mycelium. Soluble pigment is none or yellowish orange. Calcium malate around the growth is solubilized occasionally.
4. In peptone solution containing 1 percent of $NaNO_3$ incubated at 27° C.: Colorless growth with white aerial mycelium. Soluble pigment is none or slightly yellowish. Reduction of nitrate is positive.
5. On potato plug incubated at 27° C.: Colorless to pale yellowish growth with white to light bluish gray or light gray aerial mycelium (ashes 5 fe determined by CHM). No soluble pigment.
6. On starch agar plate incubated at 27° C.: Colorless growth with abundant white to light gray or light brownish gray aerial mycelium. Soluble pigment is none or slightly yellowish. No or weak hydrolysis of starch.
7. On nutrient agar incubated at 37° C.: Colorless to pale yellowish brown, good growth. Thin and white aerial mycelium. No soluble pigment.
8. On nutrient agar incubated at 27° C.: Colorless to yellowish brown growth with white aerial mycelium. No soluble pigment.
9. On blood agar (human blood 10 percent) incubated at 37° C.: Colorless growth without aerial mycelium. No soluble pigment. Strong hemolysis.
10. On Loeffler's coagulated serum medium incubated at 37° C.: Wrinkled colorless growth. No aerial mycelium and no soluble pigment. No liquefaction.
11. On gelatin medium (stab culture) incubated at 20° C.: Colorless to yellowish growth. Scant white aerial mycelium. No soluble pigment. Positive liquefaction of gelatin.
12. On milk medium (skimmed) incubated at 37° C.: Colorless to pale yellowish or brownish growth. No aerial mycelium and no soluble pigment. Medium to strong coagulation and peptonization.
13. On tyrosine agar incubated at 27° C.: Colorless growth with white to light olive gray or brownish gray aerial mycelium. No soluble pigment and no tyrosinasereaction.
14. On cellulose (filter paper) incubated at 27° C.: Slight growth but no decomposition of paper.
15. Utilization of carbohydrates on Pridham-Gottlieb's basal medium incubated at 27° C.: Mannose, inositol, starch, dextrin, lactose, glycerol, galactose, glucose, fructose and maltose gave good growth. No growth with rhamnose, inulin, dulcitol and arabinose. Xylose was probably not utilizable. Mannitol, sorbitol, salicin, raffinose and sucrose gave varied results.

Summarizing the above characteristics of MA350–C3, the strain belongs to genus *Streptomyces* and nonchromogenic type. No whorl formation but spiral structure. Spore surface is spiny. On various media, colorless to yellowish growth with white to brownish gray aerial mycelium. No or slightly yellowish soluble pigment. No or weak hydrolysis of starch. Medium to strong proteolytic action. Positive reduction of nitrate. Among the known species of *Streptomyces* the strain resembles *Streptomyces albus* Waksman and Henrici, 1948; described in The Actinomycetes vol. 2, p. 172, by S. A. Waksman. The strain can be differentiated from *S. albus* having smooth spore surface (E. Baldacci et al.; Giornale di Microbiol. I, 28, (1955): W. Flaig et al.; Zent Bakt. II Abt., 108, 376 (1955)) in respect of spiny spore surface of the said strain. The strain was found to produce aureothricin and thiolutin besides producing kasugamycin as does *S. kasugaensis*. However, *S. kasugaensis* can be clearly differentiated from the strain in spore surface, such as the smooth surface of the former and the spiny structure of the latter and in other properties as shown above. Because of the clear differentiation from known species of *Streptomyces*, the micro-organism is concluded to be a new species of *Streptomyces* and named as *Streptomyces kasugaspinus*. The designation *Streptomyces kasugaspinus* is not exclusive to actinomycetes which invariably and rigorously answer to the description given above, but it also comprises the described organism and mutants thereof which broadly possess the same properties including spiny spore surface and kasugamycin production. It is to be understood that this designation *Streptomyces kasugaspinus* also includes the natural mutants of *S. kasugaspinus* and those which can be obtained therefrom with the aid of agents or substances causing mutation, such as radiation or treatment with toxic substances.

Kasugamycin beer containing 600 mcg./cc. was produced on the 8th day of incubation when the strain was isolated from the soil and incubated in a medium consisting of maltose 4.0 percent soybean meal powder 3.0 percent (Prorich, Ajinomoto product), $K_2HPO_4$ 0.1 percent, $MgSO_4 \cdot 7H_2O$ 0.1 percent, NaCl 0.3 percent, $CuSO_4 \cdot 7H_2O$ 0.0007 percent, $ZnSO_4 \cdot 5H_2O$ 0.0002 percent, peptone 0.5 percent, $CaCO_3$ 0.35 percent and soybean oil 0.08 percent (pH 7.0) on reciprocal shaking machine (8 cm. amplitude, 140 strokes per min.) at 27° C. Kasugamycin beer containing 3950 mcg./cc. was produced when the strain was selected by monospore selection and incubated in the same way as above except employing a medium consisting of soybean meal powder (S3 meat, Ajinomoto product) 5.0 percent and soybean oil (Shirashime oil, Ajinomoto product) 4.0 percent (pH not adjusted). Thus, it is to be understood that strains giving high production of kasugamycin can be obtained from the strain by proper selection.

The following will describe experiments for the production and purification of kasugamycin but these are merely illustrative and our invention is not limited to these examples.

EXAMPLE 1

A medium consisting of maltose 4.0 percent, soybean powder 3.0 percent (Prorich, Ajinomoto product), $K_2HPO_4$ 0.1 percent, $MgSO_4 \cdot 7H_2O$ 0.1 percent, NaCl 0.3 percent, $CuSO_4 \cdot 7H_2O$ 0.0007 percent, $FeSO_4$ 0.0001 percent, $MnCl_2 \cdot 7H_2O$ 0.0008 percent, $ZnSO_4 \cdot 5H_2O$ 0.0002 percent, peptone 0.5 percent (polypeptone, Daigo Seiyaku product), $CaCO_3$ 0.35 percent and soybean oil 0.08 percent was divided to put 125 cc. in each 500 cc. flask and adjusted pH to 7.4 before autoclaving at 120° C. for 20 min. To this sterilized medium, the MA350–C STRAIN OF *Streptomyces kasugaspinus* was inoculated from a slant culture by platinum loop and incubated on reciprocal shaking machine at 27° C. for 5 days. The pH reached 7.6 at the 5th day.

This fermented broth was filtered to remove the mycelial mass and to the filtrate was added 1N HCl to precipitate insoluble materials at pH 5.0. The mixture was filtered to yield a clear solution of 450 cc. This filtrate contained 360 mg. of kasugamycin. The filtrate was passed through a column of 1.2 cm. diameter filled with 35 cc. of acidic ion exchange resin ('-'Amberlite XE-100," Amberlite product) (Ammonia type). The kasugamycin absorbed on the resin was eluted with 0.5N ammonia and the active eluate contained a total of 300 mg. of kasugamycin. The active eluate (90 cc.) was applied to a carbon column of 0.8 cm. diameter filled with 1 g. of active carbon (Wako product). After washing with deionized water (50 cc.), kasugamycin was eluted with 0.5N HCl as its HCl-salt. The active eluate of 30.2 cc. contained 180 mg. of kasugamycin in total. This eluate was evaporated by rotary evaporator under decreased pressure and below 40° C. To this concentrate of 5 cc. there was added 10 volumes of ethanol to precipitate kasugamycin. The precipitated kasugamycin was collected, dried and obtained as 140 mg. of crude crystals containing 132 mg. of kasugamycin. These crude crystals were dissolved in 8 cc. water to which was added 12 cc. ethanol. After standing at room temperature, 96 mg. of crystalline kasugamycin hydrochloride crystal was obtained. This crystalline product was found to be identical with kasugamycin hydrochloride in respect of infrared absorption spectrum, paper chromatography, thin-layer chromatography, high-voltage electrophoresis and elemental analysis.

EXAMPLE 2

A strain of *S kasugaspinus* was inoculated into 80 cc./medium in each 500 cc. shaking flask; the medium consisted of S3 meat (Ajinomoto product) 5 percent and soybean oil 4.0 percent (did not adjust pH). It was incubated at 27° C. on a reciprocal shaking machine with 8 cm. amplitude and 144 strokes per min. On the 8th day of incubation, the pH reached 8.0 and 3570 mcg./cc. of kasugamycin had accumulated. The fermented broth (920 cc.) was centrifuged to remove the mycelial mass and then filtered with the addition of methanol to obtain a clear beer. 420 cc. of clear beer, thus obtained, contained 3270 mcg./cc. of the antibiotic kasugamycin. To this there was added 400 cc. of ethyl ether to remove unused oil. The mixture was separated and the ethyl ether in the lower (aqueous) layer was removed by evaporation to yield 300 cc. of aqueous liquid containing 4250 mcg./cc. of the antibiotic. This liquid was applied to a carbon chromatocolumn of 3.2 cm. diameter. After washing with water, the elution was made by 0.05N HCl and the active fractions were collected. After neutralizing the active fraction, it was concentrated to 20 cc. to which was added ethyl alcohol to precipitate the antibiotic as a crude powder. This crude powder was dissolved in 20 cc. of water to which was added 35 cc. of ethyl alcohol. The 8.65 g. of crystalline substance thus obtained after standing overnight was identical with kasugamycin hydrochloride in melting point, optical rotation, infrared spectrum and other properties.

We claim:

1. The process for the production of kasugamycin which comprises cultivating a strain of *Streptomyces kasugaspinus* in an aqueous carbohydrate solution containing a nitrogenous nutrient under submerged aerobic conditions until a substantial quantity of kasugamycin is formed in said solution and then recovering said kasugamycin from said solution.

2. The process of claim 1 in which the organism is Streptomyces kasugaspinus NIHJ MC-2–42 and then recovering said kasugamycin from said solution.